(12) United States Patent
Lu et al.

(10) Patent No.: US 10,977,195 B2
(45) Date of Patent: Apr. 13, 2021

(54) READ-ONCE MEMORY AND METHOD OF OPERATING SAME

(71) Applicant: NXP USA, INC., Austin, TX (US)

(72) Inventors: Shixiong Lu, Tianjin (CN); Bin Sai, Tianjin (CN)

(73) Assignee: NXP USA, Inc., Austin, TX (US)

( * ) Notice: Subject to any disclaimer, the term of this patent is extended or adjusted under 35 U.S.C. 154(b) by 57 days.

(21) Appl. No.: 16/368,666

(22) Filed: Mar. 28, 2019

(65) Prior Publication Data

US 2020/0272580 A1 Aug. 27, 2020

(30) Foreign Application Priority Data

Feb. 27, 2019 (CN) .......................... 201910148360.9

(51) Int. Cl.
| | |
|---|---|
| *G06F 12/00* | (2006.01) |
| *G06F 12/14* | (2006.01) |
| *G06F 7/58* | (2006.01) |
| *G06F 21/60* | (2013.01) |

(52) U.S. Cl.
CPC .......... *G06F 12/1408* (2013.01); *G06F 7/588* (2013.01); *G06F 21/602* (2013.01); *G06F 2212/1052* (2013.01)

(58) Field of Classification Search
None
See application file for complete search history.

(56) References Cited

U.S. PATENT DOCUMENTS

| | | |
|---|---|---|
| 5,007,088 A | 4/1991 | Ooi et al. |
| 6,289,102 B1 | 9/2001 | Ueda et al. |
| 7,059,533 B2 | 6/2006 | Van Rens |
| 8,291,229 B2 | 10/2012 | Vuillaume et al. |
| 8,752,148 B1 | 6/2014 | Vipond et al. |
| 9,967,251 B1 | 5/2018 | Triandopoulos |
| 2004/0215908 A1 | 10/2004 | Zimmer et al. |
| 2009/0204824 A1* | 8/2009 | Lin ..................... G11B 20/0021 713/193 |
| 2009/0323942 A1 | 12/2009 | Sharon et al. |
| 2016/0093395 A1 | 3/2016 | Liu et al. |
| 2019/0179543 A1* | 6/2019 | Sharon ................ G06F 12/0246 |

* cited by examiner

*Primary Examiner* — Daniel D Tsui

(57) ABSTRACT

A memory controller scrambles input data and stores the scrambled data in a memory, and then allows the stored data to be read from the memory only once. The memory controller includes a true random number generator (TRNG) for generating a true random number and a pseudo-random number generator (PRNG) that uses the true random number as a seed to generate a pseudo-random number. A linear feedback shift register (LFSR) receives and shifts the pseudo-random number and then scrambles the input data using the shifted number from the LFSR. The scrambled data then is stored in the memory and the seed is stored in one of the same or a separate memory. In response to a read request, the seed is read and used to regenerate the shifted number to descramble the stored data. The stored seed is invalidated to prevent additional attempts at reading the data.

16 Claims, 3 Drawing Sheets

READ-ONCE MEMORY AND METHOD OF OPERATING SAME

BACKGROUND

The present invention generally relates to data storage and memories and, more particularly, to a memory in which the data stored therein can be read out only one time.

Sometimes data in a system is set to be processed only once for security or efficiency reasons. For example, in edge-computing applications, for privacy protection, locally collected data must be processed to remove certain identification information before saving the data to the cloud. After processing the locally collected data, it is cleared from the processor memory. In secure content distribution applications, contents such as video or audio data distributed using a network protocol is received and saved until it is accessed for decoding and playback. Once the data is played, the distributed contents must be cleared or made invalid to comply with copyright protection requirements. Similar applications include communications between modules in a semiconductor system. For example, communications between a processing core and a security root usually include commands and requests that must be deleted or cleared after being acknowledged.

It would be advantageous to have a system that ensures data is securely stored and read only once.

SUMMARY

This summary is provided to introduce a selection of concepts in a simplified form that are further described below in the Detailed Description. This summary is not intended to identify key or essential features of the claimed subject matter, nor is it intended to be used to limit the scope of the claimed subject matter.

In one embodiment, the present invention provides a memory system that receives input data and stores the input data in a memory device in response to a write request. The memory system also provides the stored data in response to a read request. The memory system includes a number generator, a scrambler, a memory controller, and a de-scrambler. The number generator generates a sequence of random numbers. The scrambler uses the sequence of random numbers to scramble the input data in response to a write request. The memory controller receives the scrambled input data from the scrambler and stores it in the memory device. The de-scrambler receives the stored, scrambled data from the memory device. The number generator reads a stored seed and regenerates the sequence of random numbers. The de-scrambler then de-scrambles the stored data, in response to the read request, using the regenerated sequence of random numbers. In a preferred embodiment, the stored seed is invalidated when it is read from its storage location.

In another embodiment, the present invention provides a memory protector that controls a memory to store data and permits the stored data to be read from the memory only once. The memory protector includes a first number generator, a scrambler, a storage device, and a de-scrambler. The first number generator generates a sequence of random numbers using a seed. The scrambler uses the sequence of random numbers to scramble input data and then provides the scrambled data to the memory for storage therein in response to a write request. The seed used to generate the sequence of random numbers also is stored in response to the write request. In response to a read request, the seed is read from its storage location and provided to the first number generator to regenerate the sequence of random numbers used to scramble the input data. The de-scrambler uses the regenerated sequence of random numbers to de-scramble the stored data in response to the read request. The memory controller invalidates the seed after it is provided to the first number generator.

In yet another embodiment, the present invention provides a method of controlling a memory to store scrambled input data and permit the stored data to be read only once. The method includes the steps of receiving input data, receiving a seed, and in response to a write request, generating a sequence of random numbers using the seed and then using the sequence of random numbers to scramble the input data. The scrambled data is stored in the memory. The seed also is saved. In response to a read request, the seed is read and the sequence of random numbers is regenerated using the stored seed, then the stored data is read and de-scrambled using the regenerated sequence of numbers. Further, the storage location of the seed is invalidated so that the data may not be read again.

BRIEF DESCRIPTION OF THE DRAWINGS

So that the manner in which the above recited features of the present invention can be understood in detail, a more detailed description of the invention may be had by reference to embodiments, some of which are illustrated in the appended drawings. The appended drawings illustrate only typical embodiments of the invention and should not limit the scope of the invention, as the invention may have other equally effective embodiments. The drawings are for facilitating an understanding of the invention and thus are not necessarily drawn to scale. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
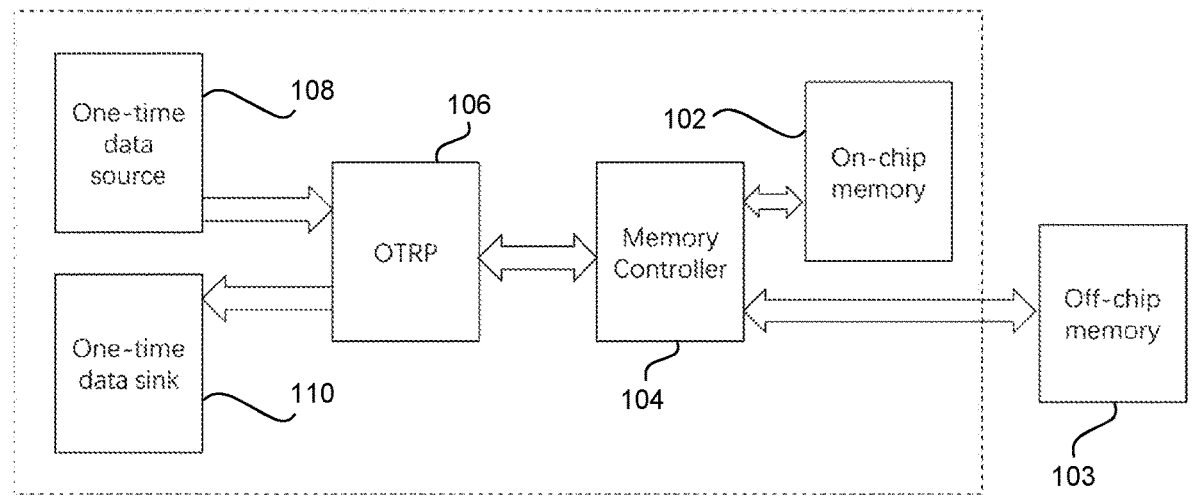
FIG. 1 is a schematic block diagram of a memory system according to an exemplary embodiment of the present invention.

FIG. 1 is a block diagram of a memory system 100 according to an exemplary embodiment of the present invention. The memory system 100 includes a memory 102 and/or a memory 103 for storing data and retrieving data from. The memory system 100 further includes a memory controller 104 to write data into or read data out of the memories 102 and/or 103. The memory system 100 includes a memory protector 106 that is connected to the memory controller 104. The memory protector 106 scrambles data before the data is stored in the memory 102 and/or 103, and allows the data stored in the memory 102/103 to be retrieved only once. In FIG. 1 "OTRP" of the memory protector 106 means "one-time readable protector". In various implementations of the current invention, the memory 102, the memory controller 104, and the memory protector 106 can be configured to be integrated in a single chip where the memory 102 is an "on-chip" memory. In such a case, the invention uses only the on-chip memory 102 and there is no off-chip memory 103. In some embodiments, the chip may be connected to the off-chip memory 103. For ease of description, the invention will be described as storing data in the memory 103. However, it will be understood by those of skill in the art that data may be stored using only the memory 102, or together with the memory 102.

In operation, the memory protector 106 receives input data from a one-time data source 108. In response to a write request, the memory protector 106 scrambles the input data to generate scrambled data. The scrambled data is provided to the memory controller 104. The memory controller 104 then writes the scrambled data into the memory 103. Subsequently, the memory 103 provides the stored data to the memory controller 104 in response to a read request. The stored data is provided to the memory protector 106 to be de-scrambled. Such retrieved data is provided to a one-time data sink 110.

The memory protector 106 performs scrambling and de-scrambling on the data using random numbers. In the currently preferred embodiment, the data are processed word by word. The memory protector 106 generates a random number for each word of the data and executes scrambling and/or de-scrambling operations on each word using the corresponding random number. Accordingly, for the multi-word data to be stored in the memory 103, the memory protector 106 generates a sequence of random numbers for the scrambling. In the presently preferred embodiment, the random numbers for the data stored in the memory 103 are made unavailable after such data is read out and de-scrambled. This allows the stored data to be retrieved only once, and prohibits the stored data from being retrieved a second time. Making the random numbers unavailable means that the memory protector 106 cannot reproduce the same sequence of random numbers for the data, by disabling the memory protector 106 from generating the random numbers for such data, or by clearing the sequence of random numbers stored elsewhere. Alternatively, the memory protector 106 is disabled from de-scrambling such data by decoupling the correspondence between the scrambled data and its sequence of random numbers.

Figure 2:
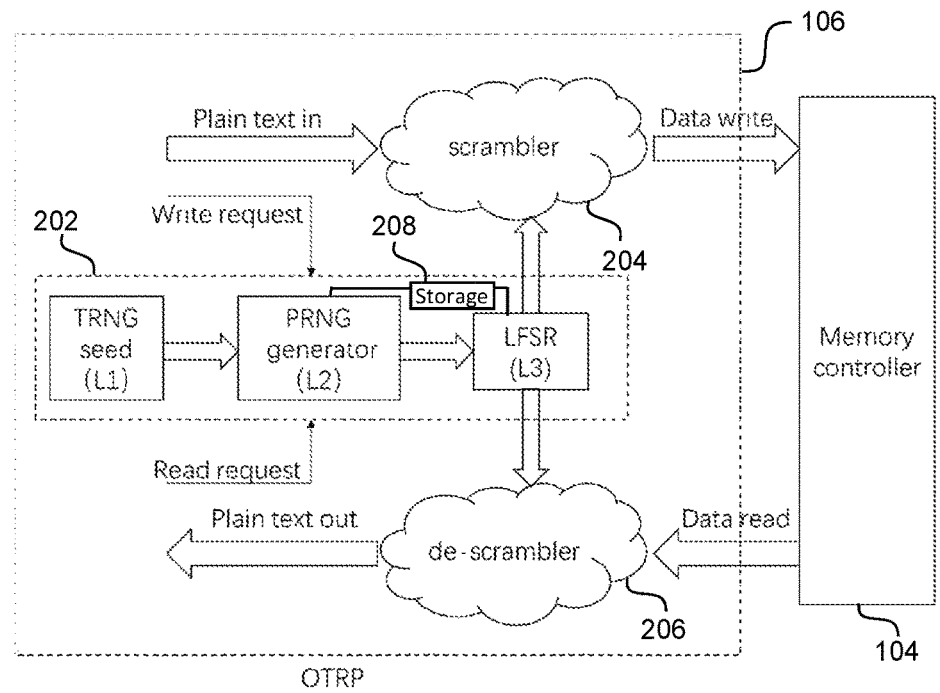
FIG. 2 is a schematic block diagram of the memory protector of FIG. 1.

FIG. 2 shows a block diagram of the memory protector 106 of FIG. 1. The memory protector 106 includes a number generator 202 which generates the sequence of random numbers for scrambling and/or de-scrambling the data. The number generator 202 provides the sequence of random numbers to a scrambler 204 which also receives the input data. The scrambler 204 scrambles the input data, using the random numbers, in response to a write request for writing the input data into the memory 103. The scrambled data generated by the scrambler 204 is provided to the memory controller 104, and in turn stored in the memory 103. In the presently preferred embodiment, the scrambler 204 performs a scrambling operation on each word of the input data with a corresponding one number of the sequence of random numbers generated by the number generator 202. Algorithms used for the scrambling are available and known, so will not be described in detail.

The number generator 202 further is connected to a de-scrambler 206, which further receives stored data from the memory controller 104. In response to the read request for reading out stored data from the memory 103, the number generator 202 provides to the de-scrambler 206 the sequence of random numbers corresponding to the data read out from the memory 103. The de-scrambler 206 performs de-scrambling operations on the data using the sequence of random numbers, to generate de-scrambled data and provide the de-scrambled data to the one-time data sink 110. The sequence of random numbers provided by the number generator 202 to the de-scrambler 206 for de-scrambling the data is the same as the sequence of random numbers used for scrambling the same data, to ensure the scrambled data to be correctly de-scrambled. Similar to the scrambler 204, the de-scrambler 206 performs de-scrambling operation on the scrambled data word by word using each corresponding number of the sequence of random numbers from the number generator 202.

The number generator 202 is a 3-level random number generator which includes first to third number generators L1 to L3. The first number generator L1 is a true random number generator (TRNG) which generates true random numbers as seeds for the second number generator L2. The second number generator L2 is a pseudo random number generator (PRNG) which generates pseudo random numbers as seeds for the third number generator L3, using the seeds from the TRNG L1. The third number generator L3 is a linear feedback shift register (LFSR) which generates pseudo random numbers using the seeds from the PRNG L2. The pseudo random numbers generated by the LFSR L3 is provided to the scrambler 204 and the de-scrambler 206 as the sequence of random numbers for scrambling and de-scrambling the data.

The number generator 202 further includes a storage device 208 which stores the seeds that the PRNG L2 provides to the LFSR L3 and corresponds the seeds with the write requests. In a subsequent reading operation in response to the read request which pairs a previous writing request for the same data, the storage device 208 provides the stored seed that corresponds with the read request to the LFSR L3, so that the LFSR L3 uses the seed to generate the same random numbers for the de-scrambling of the data. After the seed is provided to the LFSR L3 in response to the read request, the storage device 208 invalidates the seed by clearing or overwriting. The invalidation of the seed in the storage device 208 means that the LFSR L3 is unable to reproduce the sequence of random numbers. Accordingly, the data stored in the memory 103 cannot be correctly de-scrambled to retrieve the plain data, and the data is only allowed to be read once. The storage device 208 may comprise a memory, a dedicated storage location in a memory, a register, or a dedicated location in a register set, as will be understood by those of skill in the art.

Figure 3:
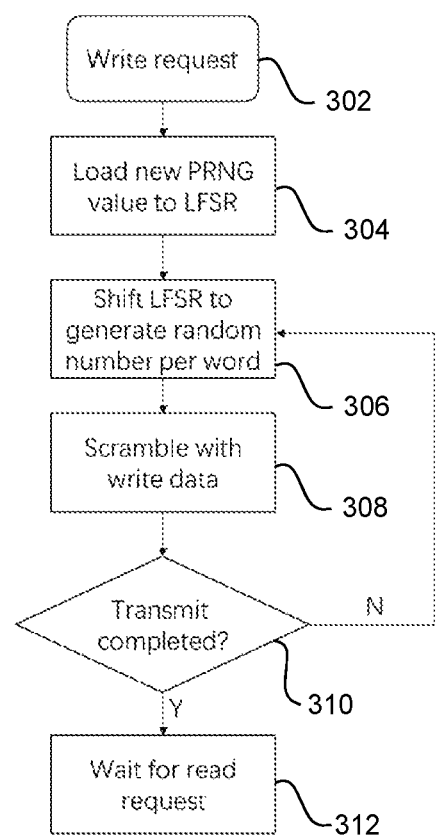
FIG. 3 is a flow chart of a method for writing data into a memory according to an exemplary embodiment of the present invention.

FIG. 3 is a flow chart of a method for writing data into a memory according to an exemplary embodiment of the present invention. The method will be explained with reference to the memory system 100 of FIG. 1 and the memory protector 106 of FIG. 2. Step 302, the memory system 100 receives a write request for writing data into the memory 103, which includes that the memory protector 106 receives a request to generate the sequence of random numbers, and the scrambler 204 receives the input data from the one-time data source 108. Step 304, in response to the write request, the LFSR L3 receives a pseudo random number as a seed. The pseudo random number is generated by the PRNG L2 using the seed of true random number from the TRNG L1. In step 306, the LFSR L3 uses the seed from the PRNG L2 to shift and generate pseudo random numbers for each word in the input data. Step 308, the scrambler 204 receives the random numbers, and scrambles the input data word to generate scrambled data. The scrambled data is provided to the memory controller 104 and stored in the memory 103.

In step 310, it is checked if all the input data associated with the write request is scrambled and sent to the memory controller 104. Step 306 is followed to generate a next random number for the scrambling if the write request is not finished, otherwise, the method goes to step 312 to store the seed from the PRNG L2 in the storage device 208, and to wait for a subsequent read request.

Figure 4:
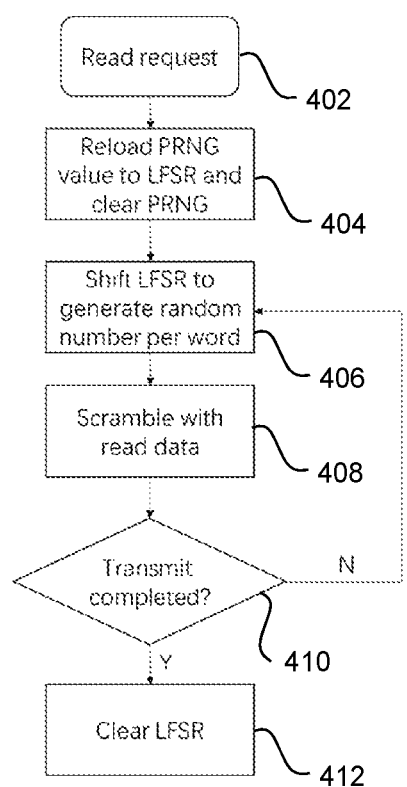
FIG. 4 is a flow chart of a method for reading data from a memory according to an exemplary embodiment of the present invention.

FIG. 4 is a flow chart of a method for reading data from a memory according to an exemplary embodiment of the present invention. The method will be explained with reference to the memory system 100 of FIG. 1, the memory protector 106 of FIG. 2, and the writing operation into the memory of FIG. 3. Starting from step 402, the memory system 100 receives a read request for reading data from the memory 103. The read request identifies the data to be read out. Step 404, in response to the read request, the storage device 208 provides the seed corresponding to the targeting scrambled data to the LFSR L3 of the number generator 202. Once the seed is provided, the storage device 208 clears the seed of the pseudo random number. Next, in step 406, the LFSR L3 uses the seed to shift and generate the pseudo random numbers for each word of the scrambled data read out from the memory 103. The generated pseudo random numbers are provided to the de-scrambler 206. Step 408, the de-scrambler 206 performs de-scrambling operations on the words of the data from the memory 103 using the received random numbers, to generate de-scrambled plain data and provide the de-scrambled data to the one-time data sink 110.

In step 410, it is checked if all the data read out from the memory 103 is de-scrambled. Step 406 is followed to generate a next random number for the de-scrambling if the read request if not finished, or otherwise if the read request is finished, the method goes to step 412 which clears the LFSR L3 to avoid extra random numbers to be generated.

The memory system 100 and method of the present invention scrambles the data from the one-time data source 108 before storing scrambled data in the memory 103. The scrambling operation uses a 3-level random number generator 202, to ensure the security of the data. On the other hand, the scrambled data read from the memory 103 must be de-scrambled using the same sequence of random numbers as that used for the scrambling, so that the reading operation is secure and invulnerable from being hacked. Once the data is read and de-scrambled, the seed for generating the sequence of random numbers for the de-scrambling is invalidated so that the scrambled data cannot be de-scrambled for a second time. The data is allowed to be read out only once to protect privacy and security.

The use of the terms "a" and "an" and "the" and similar referents in the context of describing the subject matter (particularly in the context of the following claims) are to be construed to cover both the singular and the plural, unless otherwise indicated herein or clearly contradicted by context. The terms "coupled" and "connected" both mean that there is an electrical connection between the elements being coupled or connected, and neither implies that there are no intervening elements.

Furthermore, the foregoing description is for the purpose of illustration only, and not for the purpose of limitation, as the scope of protection sought is defined by the claims set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A memory system configured to receive input data in response to a write request, store the input data in a memory, and provide the stored data in response to a read request, wherein the memory system comprises:
    a number generator that generates a sequence of random numbers;
    a scrambler connected to the number generator that receives the sequence of random numbers, and in response to the write request, the scrambler performs a scrambling operation on the input data using the sequence of random numbers;
    a memory controller connected to the scrambler that receives the scrambled input data from the scrambler and stores the scrambled input data in the memory; and
    a de-scrambler connected to the memory controller to receive the stored data from the memory, and connected to the number generator to receive a regenerated sequence of the random numbers, wherein the de-scrambler de-scrambles the stored data using the regenerated sequence of random numbers in response to the read request, and
    wherein the number generator regenerates the sequence of random numbers to be the same as the sequence of random numbers provided to the scrambler to generate the scrambled data,
    wherein the number generator comprises:
        a first number generator that generates the sequence of random numbers using a seed, and
        a storage device that stores the seed and provides the seed to the de-scrambler in response to the read request, the storage device is configured to invalidate the seed stored therein after the seed is provided to the de-scrambler in response to the read request.

2. The memory system of claim 1, wherein the scrambler is configured to perform an operation on each word of the input data with a corresponding one of the random numbers in the sequence of random numbers in order to generate the scrambled input data.

3. The memory system of claim 1, wherein the de-scrambler is configured to perform an operation on each word of the scrambled data with a corresponding one of the random numbers in the sequence of random numbers to de-scramble the stored data.

4. The memory system of claim 1, wherein the first number generator is a linear feedback shift register.

5. The memory system of claim 1, wherein the number generator further comprises a random number generator that generates random numbers as the seed.

6. The memory system of claim 5, wherein the random number generator comprises:
- a second number generator configured to generate true random numbers; and
- a third number generator connected to the second number generator to receive the true random numbers and generate pseudo random numbers using the true random number,
- wherein the pseudo random numbers are provided to the first number generator as the seed.

7. The memory system of claim 6, wherein the second number generator is a true random number generator and the third number generator is a pseudo random number generator.

8. A memory protector that stores data in a memory and permits the stored data to be read from the memory only once, the memory protector comprising:
- a first number generator that generates a sequence of random numbers using a seed;
- a scrambler connected to the first number generator for receiving the sequence of random numbers and scrambling input data using the sequence of random numbers, and providing the scrambled data to the memory for being stored therein in response to a write request;
- a storage device that stores the seed in response to the write request, and provides the stored seed to the first number generator in response to a read request; and
- a de-scrambler connected to the first number generator for receiving the sequence of random numbers generated using the seed provided by the storage device, wherein the de-scrambler de-scramble the stored scrambled data using the sequence of random numbers in response to the read request, and
- wherein the storage device is configured to invalidate the seed after the seed is provided to the first number generator.

9. The memory protector of claim 8, further comprising:
- a second number generator that generates second random numbers; and
- a third number generator that uses the second random numbers to generate third random numbers as the seed.

10. The memory protector of claim 9, wherein the second number generator is a true random number generator and the second random numbers are true random numbers.

11. The memory protector of claim 9, wherein the third number generator is a pseudo-random number generator and the third random numbers are pseudo-random numbers.

12. The memory protector of claim 8, wherein the storage device provides the seed to the first number generator for regenerating the sequence of random numbers used to scramble the data in response to the read request.

13. The memory protector of claim 8, wherein the first number generator is a linear feedback shift register.

14. A method of storing data in a memory and then permitting the stored data to be read only once from the memory, the method comprising:
- receiving input data;
- receiving a seed;
- in response to a write request for storing the input data in the memory, generating a sequence of random numbers using the seed;
- scrambling the input data using the sequence of random numbers;
- storing the scrambled input data in the memory;
- storing the seed corresponding to the input data;
- in response to a read request for reading the stored data, regenerating the sequence of random numbers using the stored seed;
- de-scrambling the stored data using the regenerated sequence of random numbers; and
- invalidating the seed in response to the stored seed being provided in response to the read request.

15. The method of claim 14, further comprising:
- generating true random numbers using a true random number generator; and
- generating pseudo-random numbers as the seed using a pseudo-random number generator, wherein the pseudo-random numbers are generated using the true random numbers.

16. The method of claim 14, wherein the generating a sequence of random numbers using the seed comprises using a linear feedback shift register to generate the sequence of random numbers.

* * * * *